(No Model.)

S. M. MARTIN.
HORSESHOEING RACK.

No. 448,060. Patented Mar. 10, 1891.

WITNESSES:
Fred G. Dieterich
Jos. A. Ryan

INVENTOR:
Samuel M. Martin.
BY Munn & Co.
ATTORNEYS

UNITED STATES PATENT OFFICE.

SAMUEL M. MARTIN, OF SIDNEY, OHIO.

HORSESHOEING-RACK.

SPECIFICATION forming part of Letters Patent No. 448,060, dated March 10, 1891.

Application filed August 14, 1890. Serial No. 362,026. (No model.)

*To all whom it may concern:*

Be it known that I, SAMUEL M. MARTIN, of Sidney, in the county of Shelby and State of Ohio, have invented a new and useful Improvement in Horseshoeing-Racks, of which the following is a specification.

My invention relates particularly to an improved harness adapted to be applied to a horse while being shod; and the object of my invention is to provide a device of this character by which I am enabled to hold any part of the animal in any desired position, and also provide a device which will relieve the animal of all strain.

A further object of my invention is to provide an adjustable device which is adapted to fit all sized animals, and a still further object of my invention is to provide an improved attachment whereby the device is rendered perfectly safe.

With these objects in view my invention consists in certain details of construction and combination of parts, as will be more fully hereinafter described and claimed.

Figure 1:
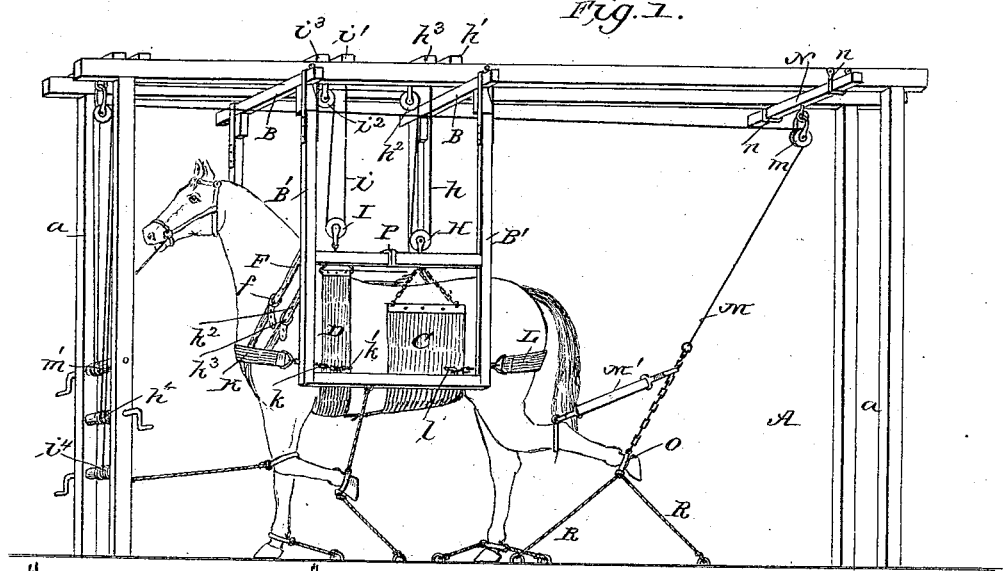
Figure 2:
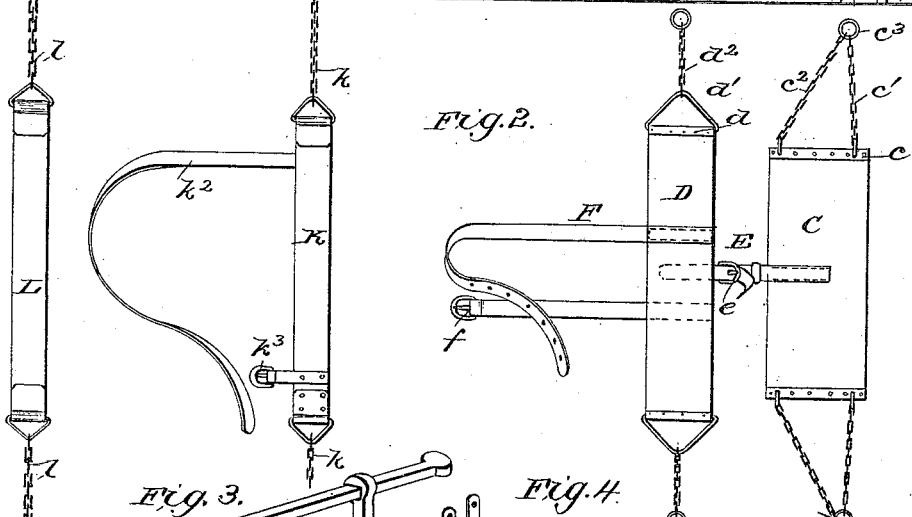
Figure 3:
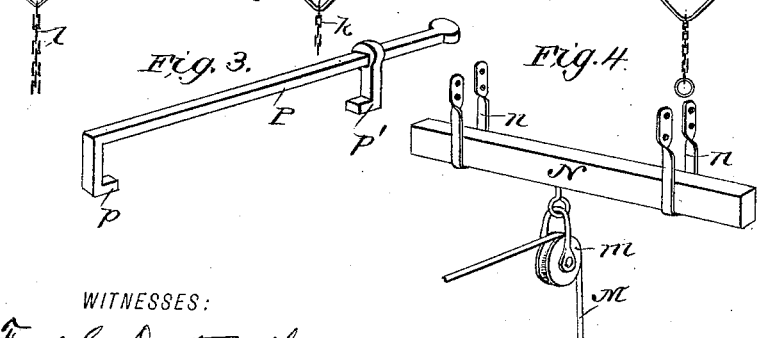
Figure 4:
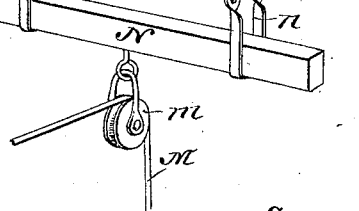

In the drawings forming a part of this specification, and in which similar letters of reference indicate the same parts, Figure 1 is a side view of my device as applied. Fig. 2 is a plan view of the various parts. Fig. 3 is a perspective view of the locking-bar. Fig. 4 is a similar view of the shifting bar and attached pulley.

In carrying out my invention I employ a frame-work or scaffold A, comprising the uprights $a$ and top piece. Cross-pieces B are secured to the under side of the top pieces, and on said cross-pieces are hung the depending rack or pen pieces B', all of the above-mentioned parts being constructed and arranged similar to those shown in my previous patent, No. 388,569, dated August 28, 1888.

To suspend the animal in the rack or pen, I employ a rear strap or band C, of canvas, leather, or other suitable material, said strap being long enough to pass nearly around the flanks of the animal from beneath and is made quite wide, as shown.

D indicates a forward strap slightly longer than the rear strap and also somewhat narrower.

The straps C and D are united by means of the connecting-strap E, said strap E having a buckle $e$, whereby the distance between the straps C and D can be regulated to suit any-sized animal. The ends of the strap or band C are tipped with metal, as at $c$, and to these metal tips near their ends are secured the chains $c'$ and $c^3$, the chains $c^2$ being longer than $c'$, and the rings $c^3$ unite the said chains at their outer ends. The ends of the strap D are also tipped, as at $d$, and in said tips are secured the triangular-shaped rings $d'$, and the chains $d^2$ are secured to said rings at their outer angles.

The forward strap D is passed beneath the animal just rear of his fore legs, and to the forward straps are secured the ends of the collar-strap F, said strap being passed between the fore legs of the animal and over the neck of the same, whereby the forward band is prevented from slipping rearward. The collar-strap is provided with a buckle $f$, by means of which the strap can be regulated to fit various-sized necks and also to bring the band D into proper position.

When the straps C and D are in proper position beneath the animal, the rings $c^3$ are attached to the pulley H, and the outer ends of the chains $d^2$ are attached to the pulley I, said pulleys being suspended upon the ropes $h$ and $i$, respectively, said ropes being secured at their upper ends to the cross-bars $h'$ and $i'$, respectively, passed through the pulleys H and I, and then through the pulleys $h^2$ and $i^2$, respectively, which are attached to the cross-bars $h^3$ and $i^3$. The lower ends of the ropes $h$ and $i$ are wound upon the windlasses $h^4$ and $i^4$, respectively, whereby either the front or rear portion of the animal may be elevated.

K indicates a breast-strap, which is narrower and longer than the forward strap D, the ends being tipped and provided with chains similar to said strap D. The breast-strap is passed around the breast of the animal, the chain $k$ at the ends being secured to the hooks $k'$, arranged near the forward end of the lower members of the rack or pen. A neck-strap $k^2$ is secured to the breast-strap K and is passed around the neck of the animal, and is provided with a buckle $k^3$, for a purpose already set forth. A breeching-strap L, similar to the breast-strap, except the neck-strap, is passed around the hind quarters of the animal, the chains *l* being secured upon the hooks *l'*.

M indicates a rope adapted to raise the hind leg of the animal, said rope passing through the pulley *m* and being wound upon the windlass *m'*. The pulley *m* is hung from a laterally-shifting cross-piece N, said cross-piece resting in the stirrups *n*, attached to the top pieces of the scaffold. By means of the laterally-shifting bar the pulley can be moved sidewise, whereby all danger of twisting the animal's leg is avoided. The rope M is attached to a strap O, secured just above the pastern-joint.

M' indicates a strap having snaps at each end, one end being secured to a strap secured just above the hock-joint, the other end being connected with the main rope M. By this construction the hock and toe will be raised at the same time and all strain avoided. The rope M can be disconnected from the hind leg and used to elevate the fore leg. A locking-bar P is adapted to rest upon the top side members of the rack or pen, said bar having a depending foot *p*, which rests upon the side of one member, and to bind the sides of the rack a sliding foot *p'* is employed, which foot slides upon the bar against the opposite side of the rack and holds it in place.

The stay-rope R for the hind leg is to be fastened to a ring in the floor and to a ring in the band around the fetlock, which makes a substantial brace for the leg at a proper height for shoeing and is adjustable to different heights.

Having thus described my invention, what I claim as new is—

In the device herein shown and described, the combination, with a scaffold, of a supporting-rack suspended from the said scaffold and adapted to retain the animal, a transversely-shifting bar arranged at the top of the scaffold and to the rear of the rack, a pulley attached to said bar, and a rope passing over said pulley, adapted to be attached at one end to the hind leg of the animal, substantially as and for the purpose described.

SAMUEL M. MARTIN.

Witnesses:
 JOHN KNOOP,
 T. C. BUCHANAN.